US010355557B2

(12) United States Patent
Chiu et al.

(10) Patent No.: US 10,355,557 B2
(45) Date of Patent: Jul. 16, 2019

(54) OCEAN CURRENT POWER GENERATING DEVICE

(71) Applicant: National Taiwan University, Taipei (TW)

(72) Inventors: Forng-Chen Chiu, Taipei (TW); Jen-Hwa Guo, Taipei (TW); Jing-Fa Tsai, Taipei (TW); Jen-Shiang Kouh, Taipei (TW); Jiahn-Horng Chen, Taipei (TW); Ching-Yeh Hsin, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 15/483,242

(22) Filed: Apr. 10, 2017

(65) Prior Publication Data

US 2018/0291864 A1   Oct. 11, 2018

(30) Foreign Application Priority Data

Apr. 5, 2017 (TW) .............................. 106111336 A (51) Int. Cl.
*H02K 7/18* (2006.01)
*F03B 13/10* (2006.01)
*F03B 17/06* (2006.01)

(52) U.S. Cl.
CPC .......... *H02K 7/1823* (2013.01); *F03B 13/10* (2013.01); *F03B 17/061* (2013.01); *F05B 2220/32* (2013.01); *F05B 2220/706* (2013.01); *F05B 2240/922* (2013.01); *F05B 2240/93* (2013.01); *F05B 2240/97* (2013.01); *F05B 2260/30* (2013.01); *F05B 2270/18* (2013.01); *F05B 2270/20* (2013.01); *F05B 2270/605* (2013.01);

(Continued)

(58) Field of Classification Search
CPC .. F03B 11/02; F03B 3/04; F03B 13/10; F03B 17/061; H02K 7/1823; F05B 2220/32; F05B 2220/706; F05B 2240/93; F05B 2240/922; F05B 2240/97; F05B 2260/30; F05B 2270/18; F05B 2270/20; F05B 2270/605; Y02E 10/22; Y02E 10/223; Y02E 10/226
USPC ............................................. 290/54, 44, 43
See application file for complete search history.

(56) References Cited

U.S. PATENT DOCUMENTS 8,766,466 B2 * 7/2014 Dehlsen ................ F03B 17/061
 290/43
9,890,762 B2 * 2/2018 McManus ............... F03B 13/00
(Continued)

FOREIGN PATENT DOCUMENTS

JP    2011-525877 A    9/2011
JP    2016-169696 A    9/2016
JP    2016-200075 A    12/2016

*Primary Examiner* — Charles Reid, Jr.

(57) ABSTRACT

The invention discloses an ocean current power generator disposed in the ocean. The ocean current power generator includes two power generators, a foil floating member and a control unit. Each of the power generators includes an impeller, and the ocean current drives the impellers to rotate to generate electricity. The foil floating member is connected to the two power generators, and the foil floating member includes a front body and a rear body. The control unit is configured to control the amount of sea water in the front body or the rear body, so as to adjust the center of gravity of the foil floating member.

22 Claims, 10 Drawing Sheets

(52) U.S. Cl.
CPC .............. *Y02E 10/22* (2013.01); *Y02E 10/223* (2013.01); *Y02E 10/226* (2013.01)

(56) References Cited

U.S. PATENT DOCUMENTS

| | | | | |
|---|---|---|---|---|
| 10,053,216 | B2* | 8/2018 | Bormann | ................ B64C 31/06 |
| 10,087,908 | B2* | 10/2018 | Kumano | ................ F03B 13/10 |
| 2007/0046028 | A1* | 3/2007 | Gizara | ...................... B63B 1/24 |
| | | | | 290/54 |
| 2010/0327583 | A1* | 12/2010 | Hunt | ...................... B63B 21/50 |
| | | | | 290/43 |
| 2012/0045329 | A1* | 2/2012 | Smith | ...................... H02P 9/04 |
| | | | | 416/1 |
| 2012/0137950 | A1* | 6/2012 | Rapp | ........................ C25B 1/12 |
| | | | | 114/331 |

* cited by examiner

OCEAN CURRENT POWER GENERATING DEVICE

CROSS REFERENCE TO RELATED APPLICATIONS

This application claims the benefit of Taiwan Patent Application No. 106111336, filed on Apr. 5, 2017, the entirety of which is incorporated by reference herein.

BACKGROUND OF THE DISCLOSURE

Field of the Disclosure

The present disclosure relates to an ocean current power generating device, and more particularly to an ocean current power generating device with a foil floating member.

Description of the Related Art

Because global crude oil reserves are rapidly decreasing, renewable energy such as solar energy, wind energy, geothermal energy, ocean energy, biomass energy, and fuel cells that are clean and low-polluting have gradually come into international focus. Among these types of energy sources, ocean energy is generated from a power generator. When the ocean current flows and drives the impeller of the power generator to rotate, the power generator converts the kinetic energy of an ocean current into electricity, and then transmits this electricity to a receiving apparatus (receiving terminal) on land via a cable.

Generally speaking, a power generating device for generating electricity using the ocean current includes a floating body and a power generator which is connected to the floating body, and the power generator includes an impeller and a plurality of blades. The power generating device is fixed to the seabed by a cable, and the power generating device floats in the ocean current, so that the ocean current drives the impeller to rotate to generate electricity.

However, conventional ocean current power generating devices only utilize the floating body to import or discharge seawater, so as to control the depth of the ocean current power generating device in the ocean, but the depth of the ocean current power generating device in the ocean is limited using this manner.

BRIEF SUMMARY OF THE DISCLOSURE

Accordingly, the invention provides an ocean current power generating device, to solve the problems described above.

An ocean current power generating device is disposed in the ocean, and the ocean current power generating device includes two power generators, a foil floating member and a control unit. Each of the power generators includes an impeller, wherein the ocean current drives the impeller to rotate to generate electricity. The foil floating member is connected to the two power generators, and the foil floating member includes a front body and a rear body. The control unit is configured to control the amount of seawater in the front body or in the rear body, so as to adjust the center of gravity of the foil floating member.

In some embodiments, the front body includes a front chamber, the rear body includes a rear chamber, and the foil floating member further includes a central chamber, disposed between the front chamber and the rear chamber, so as to receive the control unit.

In some embodiments, the foil floating member further includes a plurality of bulkheads, disposed in the front chamber to divide the front chamber into a plurality of spaces, wherein each of the bulkheads includes a bottom portion and a through hole, and the through hole is disposed near the bottom portion and communicates with the spaces.

In some embodiments, the volume of the front chamber is equal to the volume of the rear chamber.

In some embodiments, the front body includes a front vent valve and a front water valve, which are communicated with the front chamber, and the rear body includes a rear vent valve and a rear water valve, which are communicated with the rear chamber. The control unit controls the front vent valve and the rear vent valve to open to discharge the air in the front chamber and the rear chamber, and the control unit controls the front water valve and the rear water valve to open, so as to import seawater into or discharge seawater from the front chamber and the rear chamber.

In some embodiments, the foil floating member further includes a communicating tube, communicated with the front chamber and the rear chamber, so as to allow seawater to flow between the front chamber and the rear chamber.

In some embodiments, the foil floating member further includes a high-pressure gas pipe, communicated with the front chamber and the rear chamber, and the control unit includes a high-pressure gas generator. The high-pressure gas generated from the high-pressure gas generator flows to the front chamber or the rear chamber through the high-pressure gas pipe, so as to push seawater to flow in the communicating tube.

In some embodiments, the high-pressure gas generator inflates the front chamber, seawater in the front chamber flows into the rear chamber through the communicating tube, so that the center of gravity of the foil floating member moves toward the rear chamber, and the front body of the foil floating member tilts upward relative to a horizontal plane.

In some embodiments, when the high-pressure gas generator inflates the rear chamber, seawater in the rear chamber flows into the front chamber through the communicating tube, so that the center of gravity of the foil floating member moves toward the front chamber, and the front body of the foil floating member tilts downward relative to a horizontal plane.

In some embodiments, the front body includes a first chamber, a second chamber and a first communication valve, the rear body includes a third chamber, a fourth chamber and a second communication valve, the first chamber is communicated with the second chamber through the first communication valve, and the third chamber is communicated with the fourth chamber through the second communication valve.

In some embodiments, the foil floating member further includes a plurality of bulkheads, disposed in the first to the fourth chambers, wherein each of the bulkheads includes a bottom portion and a through hole, and the through hole is disposed near the bottom portion.

In some embodiments, the front body includes a front vent valve and a front water valve, communicated with the first chamber, and the rear body includes a rear vent valve and a rear water valve, communicated with the third chamber. The control unit controls the first communication valve, the second communication valve, the front vent valve and the rear vent valve to open to discharge the air in the first to the fourth chambers, and the control unit controls the front water valve and rear water valve to open, so as to import seawater into or discharge seawater from the first to the fourth chambers.

In some embodiments, the foil floating member further includes a communicating tube, communicated with the first chamber and the third chamber, so as to allow seawater to flow between the first chamber and the third chamber.

In some embodiments, the foil floating member further includes a high-pressure gas pipe, communicated with the first to the fourth chambers, and the control unit includes a high-pressure gas generator. The high-pressure gas generated from the high-pressure gas generator flows to at least one of the first to the fourth chambers through the high-pressure gas pipe.

In some embodiments, when the control unit controls the first communication valve and the second communication valve to open, the high-pressure gas generator transmits the high-pressure gas to the first chamber and the third chamber to push seawater in the first chamber and the third chamber to respectively flow into the second chamber and the fourth chamber, so that the center of gravity of the foil floating member moves toward the second chamber and the fourth chamber.

In some embodiments, when the control unit controls the first communication valve and the second communication valve to open, the high-pressure gas generator transmits the high-pressure gas to the second chamber and the fourth chamber to push seawater in the second chamber and the fourth chamber to respectively flow into the first chamber and the third chamber, so that the center of gravity of the foil floating member moves toward the first chamber and the third chamber.

In some embodiments, the ocean current power generating device further includes four piston mechanisms, configured to import seawater into or discharge seawater from the foil floating member, wherein two of the piston mechanisms are disposed in the front body, and the other two piston mechanisms are disposed in the rear body.

In some embodiments, each of the piston mechanisms comprises a receiving space, formed in the foil floating member; and a piston member, movably disposed in the receiving space. The control unit drives the piston member to move in the receiving space, so as to allow seawater to enter the receiving space or to discharge seawater from the receiving space.

In some embodiments, the ocean current power generating device further comprises an anchor block, fixed on the seabed; and two cables, configured to connect the two power generators with the anchor block.

In some embodiments, the ocean current power generating device further comprises at least one floating body, connected to the two cables and disposed between the anchor block and the two power generators.

The invention provides an ocean current power generating device, and the control unit of the ocean current power generating device can control the amount of seawater in the front body or the rear body, so as to change the position of the center of gravity of the foil floating member, so that the foil floating member tilts to be raised upward or be pushed downward by the hydrodynamic force in the ocean current. As a result, the depth of the main body in the ocean can be changed. Therefore, in contrast to a conventional ocean current power generating device which only utilizes the buoyancy to control the depth, the ocean current power generating device of the invention can save more energy and can submerge to a deeper position in the ocean.

DETAILED DESCRIPTION OF THE ILLUSTRATIVE EMBODIMENTS

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 1:
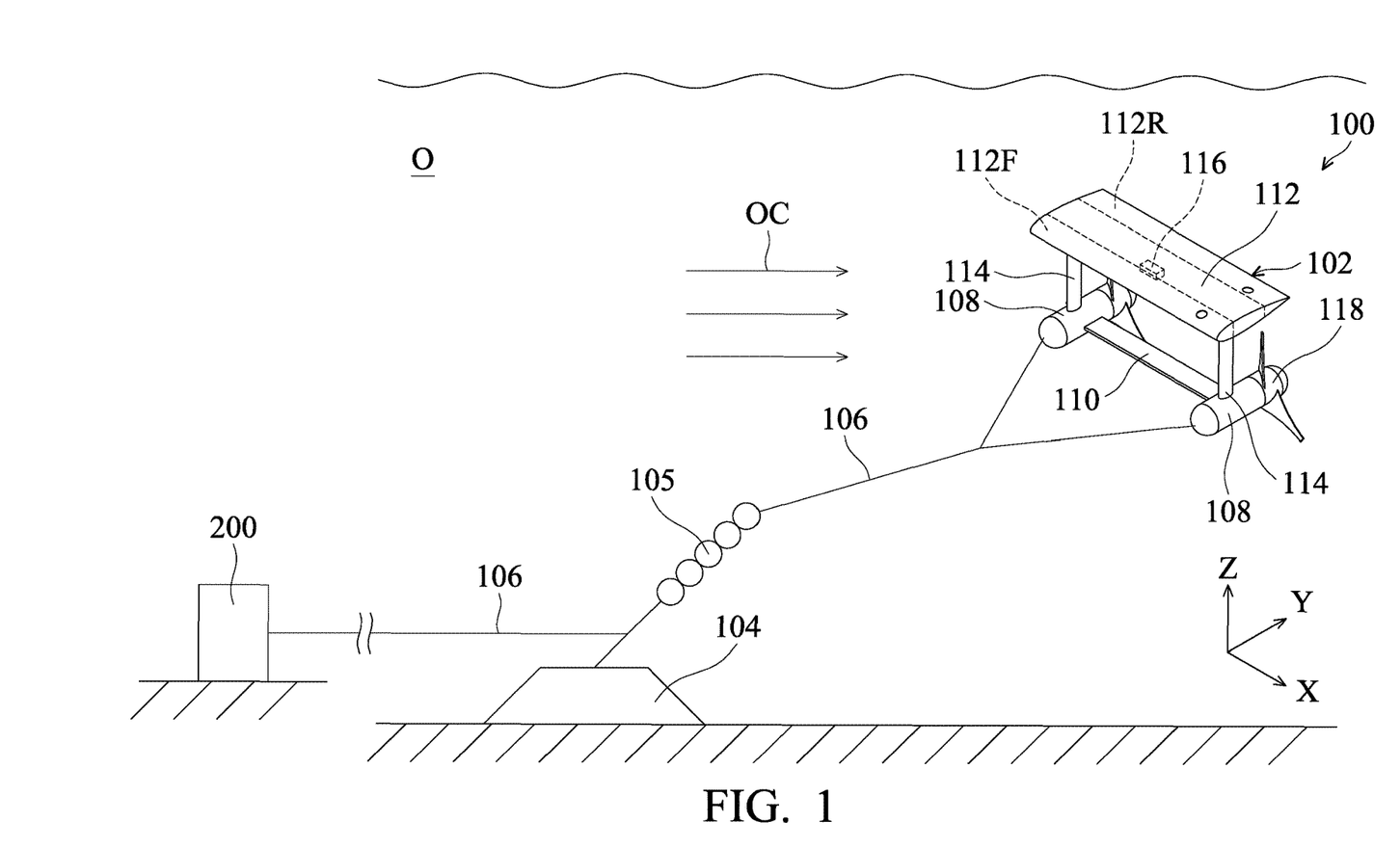
FIG. 1 is a diagram of an ocean current power generating device according to an embodiment of the invention.

Please refer to FIG. 1, which is a diagram of an ocean current power generating device 100 according to an embodiment of the invention. The ocean current power generating device 100 is disposed in ocean O for converting the kinetic energy of an ocean current OC in the ocean O into electricity, so as to achieve a purpose of extracting energy from the ocean O. As shown in FIG. 1, the ocean current power generating device 100 includes a main body 102, an anchor block 104 and at least one cable 106. The anchor block 104 is fixed on the seabed, and the cable 106 is configured to connect the main body 102 to the anchor block 104, so that the main body 102 can float in a specific area of the ocean O and does not leave the specific area. In this embodiment, the ocean current power generating device 100 can also include two cables for connecting the anchor block 104 and the main body 102. In addition, the ocean current power generating device 100 further includes a plurality of floating balls 105 (floating body) disposed on the cable 106 and between the main body 102 and the anchor block 104. The floating balls 105 provide the cable 106 with sufficient buoyant force, so as to prevent the cable 106 from rubbing against the seabed and being damaged. As shown in FIG. 1, the cable 106 can further be connected to a control center 200 on land. The control center 200 can include a power storage apparatus for storing the electricity extracted by the ocean current power generating device 100 and transmitted through the cable 106. Furthermore, the control center 200 can also send an electrical signal to the main body 102 through the cable 106, so as to control the operation of internal members of the main body 102.

In particular, the main body 102 includes two power generators 108, a connecting member 110, a foil floating member 112, two connecting columns 114 and a control unit 116. Each of the power generators 108 includes an impeller 118. When the main body 102 is disposed in the ocean O, the ocean current OC drives the impeller 118 rotating to generate electricity. The connecting member 110 is connected between the two power generators 108, and the two connecting columns 114 are respectively connected to the foil floating member 112 and the two power generators 108. As shown in FIG. 1, the control unit 116 can be disposed in the foil floating member 112, and the foil floating member 112 can define a front body 112F and a rear body 112R. The control unit 116 is configured to control the amount of seawater in the front body 112F or the rear body 112R, so as to adjust the center of gravity of the foil floating member 112 and the posture of the foil floating member 112.

Figure 2:
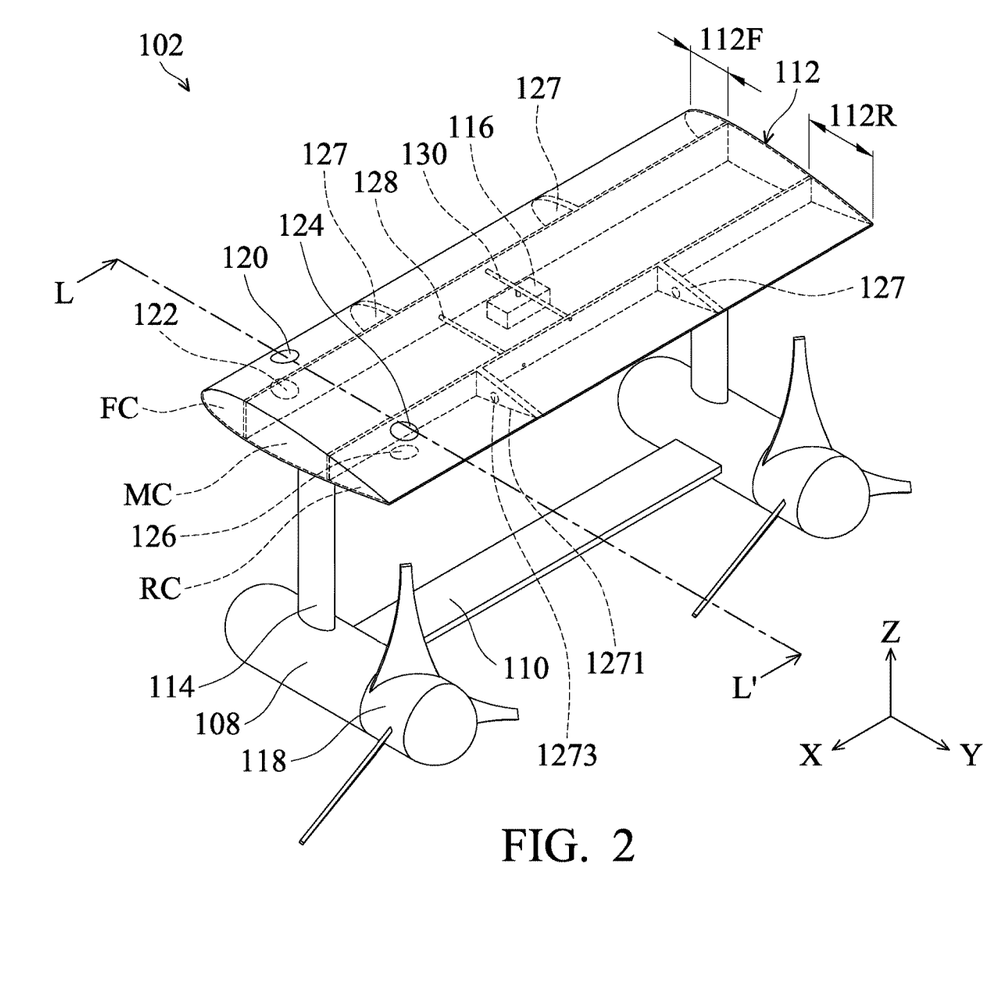
FIG. 2 is a perspective view of a main body according to the embodiment of the invention.
Figure 3:
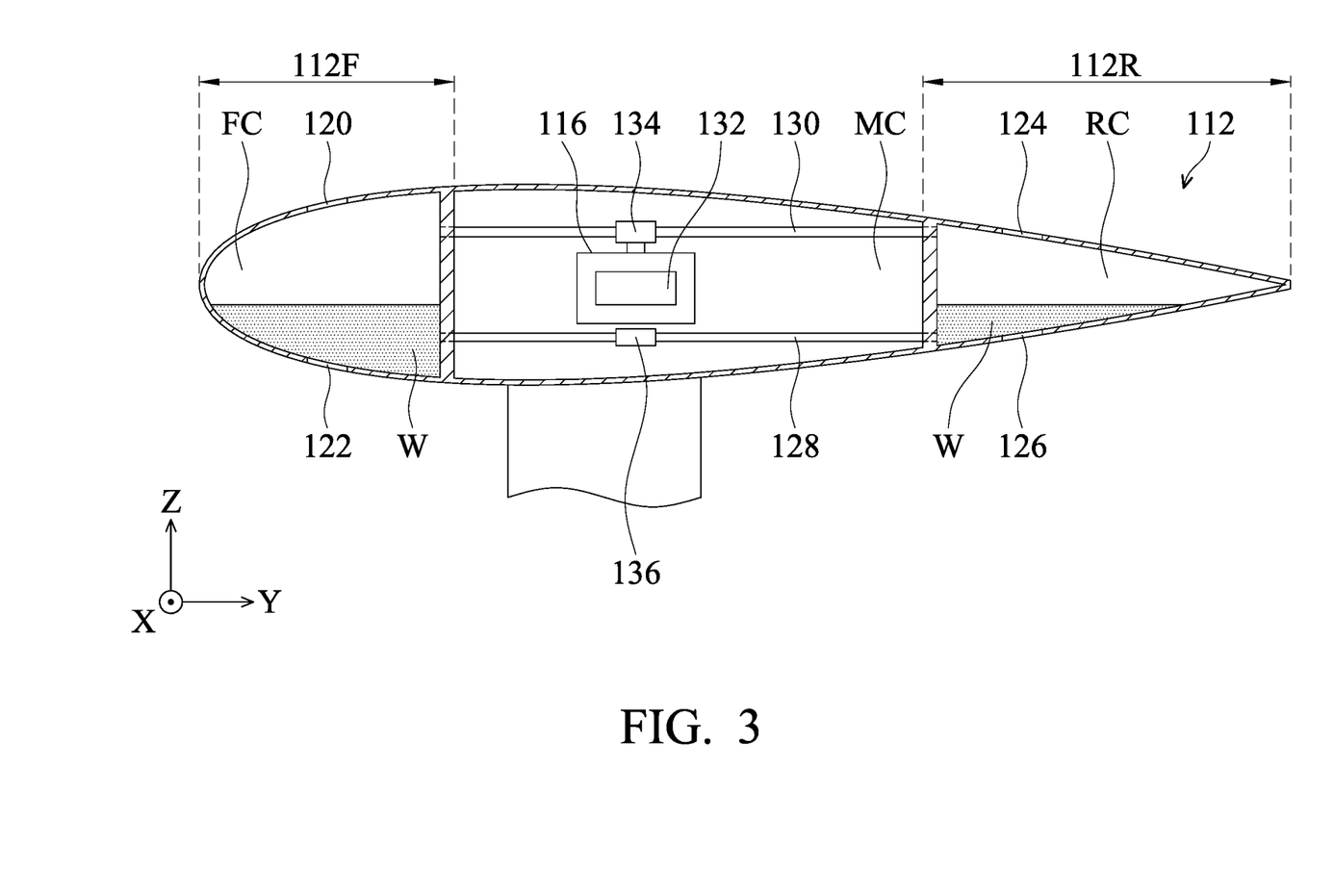
FIG. 3 is a sectional view of the main body along line L-L' in FIG. 2.

Please refer to FIG. 1 to FIG. 3, FIG. 2 is a perspective view of the main body 102 according to the embodiment of the invention. FIG. 3 is a sectional view of the main body 102 along line L-L' in FIG. 3. As shown in FIG. 2 and FIG. 3, the front body 112F can define a front chamber FC across the foil floating member 112, and the rear body 112R can define a rear chamber RC across the foil floating member 112. The foil floating member 112 further includes a central chamber MC, disposed between the front chamber FC and the rear chamber RC, and the central chamber MC is configured to receive the control unit 116. In particular, the volume of the central chamber MC is greater than the volume of the front chamber FC or the volume of the rear chamber RC, and the volume of the front chamber FC is equal to the volume of the rear chamber RC. For example, a ratio of the volumes of the front chamber FC, the central chamber MC, and the rear chamber RC can be 1:3:1, but it is not limited thereto.

As shown in FIG. 2 and FIG. 3, the front body 112F includes a front vent valve 120 and a front water valve 122 which are communicated with the front chamber FC, and the rear body 112R includes a rear vent valve 124 and a rear water valve 126 which are communicated with the rear chamber RC. The control unit 116 can control the front vent valve 120 and the rear vent valve 124 to open, so that the air in the front chamber FC and the rear chamber RC is discharged from the front chamber FC and the rear chamber RC through the front vent valve 120 and the rear vent valve 124. In addition, the control unit 116 can also control the front water valve 122 and the rear water valve 126 to open, so that seawater W (as shown in FIG. 3) can be imported into or be discharged from the front chamber FC and the rear chamber RC. Specifically, the front vent valve 120, the front water valve 122, the rear vent valve 124 and the rear water valve 126 can be solenoid valves, which are electrically connected to the control unit 116, but it is not limited thereto.

In this embodiment, the foil floating member 112 includes a plurality of bulkheads 127, which are disposed in the front chamber FC and the rear chamber RC. Each of the bulkheads 127 includes a bottom portion 1271 and a through hole 1273, and the through hole 1273 is disposed near the bottom portion 1271, but it is not limited thereto. The bulkheads 127 with the through holes 1273 are disposed in the front chamber FC and the rear chamber RC to divide the front chamber FC and the rear chamber RC into a plurality of spaces, so that seawater can flow in the spaces through the through holes 1273. The arrangement of the bulkheads 127 can prevent the foil floating member 112 of the main body 102 from being unstable due to free surface effect.

As shown in FIG. 2 and FIG. 3, the foil floating member 112 further includes a communicating tube 128 and a high-pressure gas pipe 130, which are respectively communicated with the front chamber FC and the rear chamber RC. The control unit 116 includes a high-pressure gas generator 132 which is connected to the high-pressure gas pipe 130. High-pressure gas generated from the high-pressure gas generator 132 flows to the front chamber FC or the rear chamber RC through the high-pressure gas pipe 130. The foil floating member 112 further includes a first control valve 134 and a second control valve 136. The first control valve 134 is disposed on the high-pressure gas pipe 130, and the second control valve 136 is disposed on the communicating tube 128. The first control valve 134 and the second control valve 136 can be two-way valves which are connected to the control unit 116. The control unit 116 can control the first control valve 134, so that the high-pressure gas generated from the high-pressure gas generator 132 can flow in the front chamber FC and the rear chamber RC through the through holes 1273 of the bulkheads 127. The control unit 116 can control the second control valve 136, so that seawater W in the front chamber FC can flow into the rear chamber RC through the communicating tube 128, or seawater W in the rear chamber RC can flow into the front chamber FC through the communicating tube 128. Furthermore, each of the bulkheads 127 can further include another opening disposed a position far away from the bottom portion 1271 (a position higher than the through hole 1273), and the high-pressure gas generated from the high-pressure gas generator 132 can flow in the front chamber FC and the rear chamber RC through these openings.

Figure 4:
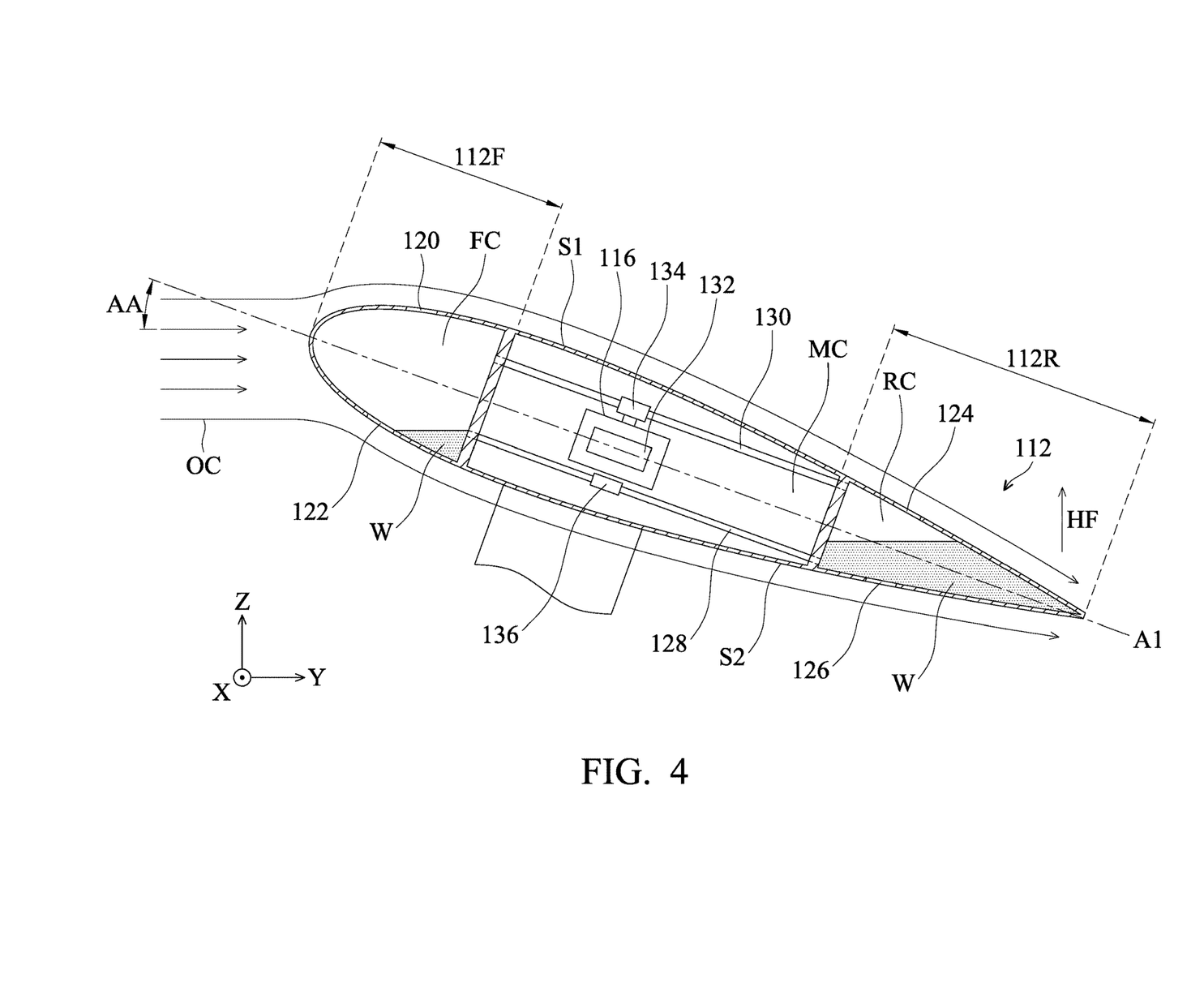
FIG. 4 is a diagram illustrating that a front body of a foil floating member tilts upward relative to the ocean current.

Please refer to FIG. 1, FIG. 3 and FIG. 4. FIG. 4 is a diagram illustrating that the front body 112F of the foil floating member 112 tilts upward relative to the ocean current OC. As shown in FIG. 3, the volume of seawater W in the front chamber FC is the same with the volume of seawater W in the rear chamber RC at this time, and the second control valve 136 is not opened, so that seawater W in the front chamber FC does not flow into the rear chamber RC through the communicating tube 128. When it is desired to control the main body 102 to float upward along the Z axis, the control center 200 can send a control signal to the control unit 116 through the cable 106. At this time, the control unit 116 controls the first control valve 134 according to the control signal to allow the high-pressure gas to flow toward the front chamber FC, and the control unit 116 controls the second control valve 136 to allow seawater W to flow toward the rear chamber RC. Because the high-pressure gas generator 132 of the control unit 116 inflates the front chamber FC, the pressure in the front chamber FC gradually increases due to the high-pressure gas, so as to push seawater W in the front chamber FC to flow into the rear chamber RC through the communicating tube 128. For example, 80% of seawater W in the front chamber FC can flow into the rear chamber RC through communicating tube 128, so that the amount of seawater W in the rear chamber RC is greater than the amount of seawater W in the front chamber FC. As a result, the center of gravity of the foil floating member 112 moves toward the rear chamber RC, resulting in the tilt of the foil floating member 112 (as shown in FIG. 4).

As shown in FIG. 4, the foil floating member 112 includes an axis A1, an upper surface S1, and a lower surface S2. An angle AA (attack angle) is formed between the axis A1 of the foil floating member 112 and a direction of the ocean current OC (a direction along the X axis). When the front body 112F raises to serve as an incident side and is higher than the rear body 112R, the speed of the ocean current OC passing by the upper surface S1 is higher than the speed of the ocean current OC passing by the lower surface S2, so as to generate an upward hydrodynamic force HF onto the foil floating member 112. Therefore, the main body 102 is raised by the hydrodynamic force HF along the Z axis, so as to decrease the depth of the main body 102 in the ocean O.

Conversely, when it is desired to control the main body 102 to submerge along the −Z axis, the control unit 116 can control the first control valve 134 to open toward the rear chamber RC and control the second control valve 136 to open toward the front chamber FC. Then, the control unit 116 controls the high-pressure gas generator 132 to inflate the rear chamber RC. As a result, the pressure in the rear chamber RC increases due to the high-pressure gas, so as to push seawater W in the rear chamber RC to flow into the front chamber FC through the communicating tube 128. At this time, the amount of seawater W in the front chamber FC is greater than the amount of seawater W in the rear chamber RC, so that the center of gravity of the foil floating member 112 moves toward the front chamber FC, resulting in the tilt of the foil floating member 112 (as shown in FIG. 5).

Figure 5:
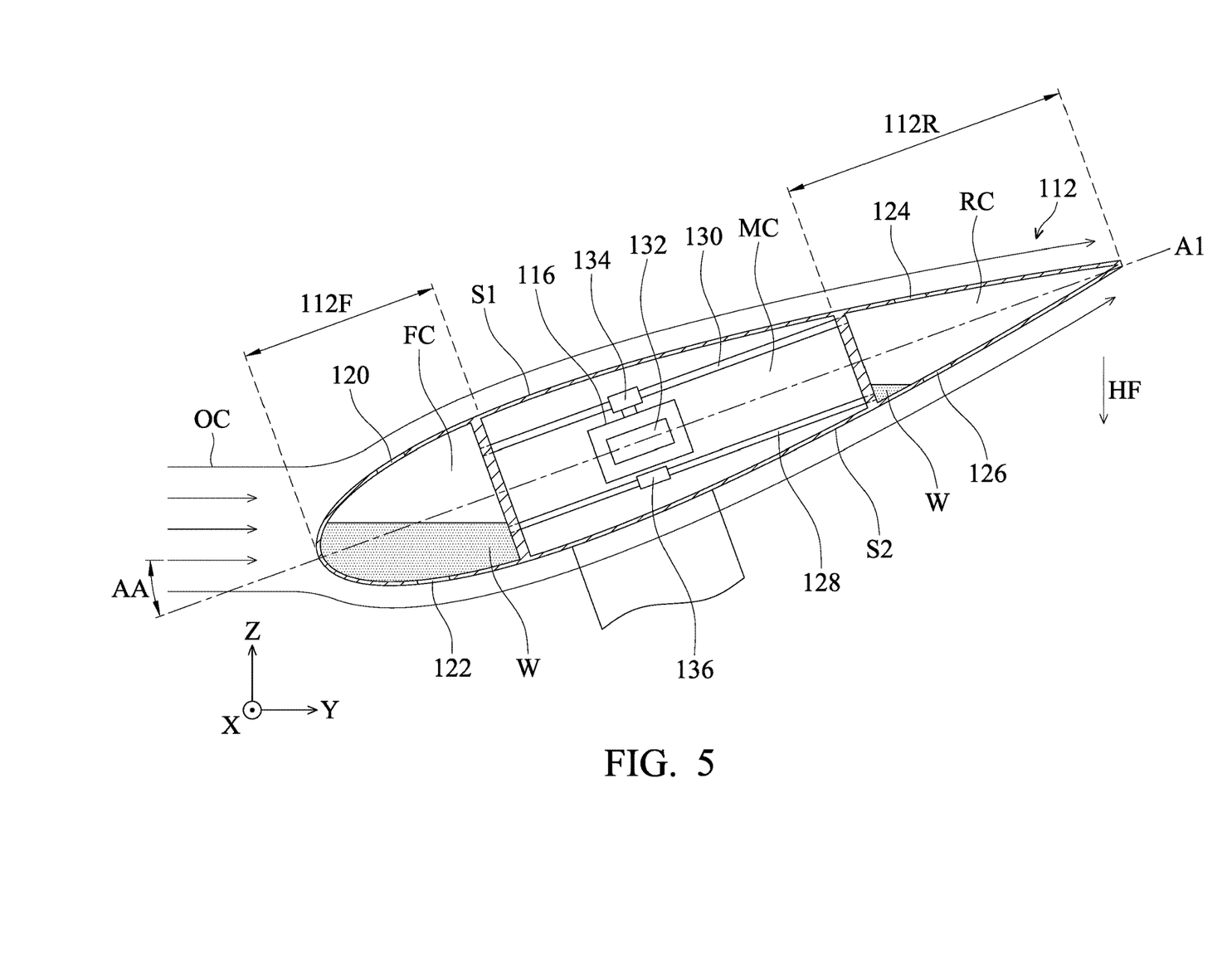
FIG. 5 is a diagram illustrating that the front body of the foil floating member tilts downward relative to the ocean current.

FIG. 5 is a diagram illustrating that the front body 112F of the foil floating member 112 tilts downward relative to the ocean current OC. The front body 112F submerges toward the seabed, so that the speed of the ocean current OC passing by the upper surface S1 is lower than the speed of the ocean current OC passing by the lower surface S2 at this time, so as to generate an downward hydrodynamic force HF onto the foil floating member 112. Therefore, the main body 102 is submerged by the hydrodynamic force HF along the −Z axis, so as to increase the depth of the main body 102 in the ocean O.

It can be known according to the foregoing description that when the control unit 116 controls the amount of seawater W in the front chamber FC and the rear chamber RC, the center of gravity of the foil floating member 112 can be moved toward the front chamber FC or the rear chamber RC, so as to generate the upward hydrodynamic force HF or the downward hydrodynamic force HF to control the depth of the main body 102 in the ocean O. For example, when the main body 102 is at a depth of 10 meters and there is a long wave (wavelength is about 100 meters) on the ocean O, the main body 102 can be submerged to a deeper position (such as 40 meters) by the downward hydrodynamic force HF, so as to increase the stability of the main body 102 in the ocean O.

A conventional ocean current power generating device only adjusts the amount of seawater therein to increase or decrease the buoyancy, so as to control the depth of the conventional ocean current power generating device in the ocean. Thus, the conventional ocean current power generating device has to discharge seawater in a deeper position to rise to sea level. Because the water pressure is greater at a deeper position, the conventional ocean current power generating device in the deeper position has to consume more energy to discharge seawater therein, so as to raise the conventional ocean current power generating device.

Conversely, when it is desired to raise the main body 102 to the sea level, the control center 200 can control the posture of the main body 102 to generate the upward hydrodynamic force HF to raise the main body 102 from a deeper position (depth=25 meters) to a position whose depth is smaller (depth=15 meters). After that, the control unit 116 controls the high-pressure gas generator 132, the front water valve 122 and the rear water valve 126 to open, so as to discharge seawater W in the front chamber FC and the rear chamber RC. When seawater W in the front chamber FC and the rear chamber RC is gradually discharged, the main body 102 is raised to the sea level by the buoyancy force. Because the energy consumed by discharging seawater W at a depth of 25 meters is greater than the energy consumed by discharging seawater W at a depth of 15 meters, the main body 102 can discharge seawater at a less depth position, such as a depth of 15 meters instead of a depth of 25 meters, so as to reduce energy consumption. Consequently, the ocean current power generating device 100 of the invention has the advantages of saving energy, protecting the environment, and being highly efficient.

Figure 6A:
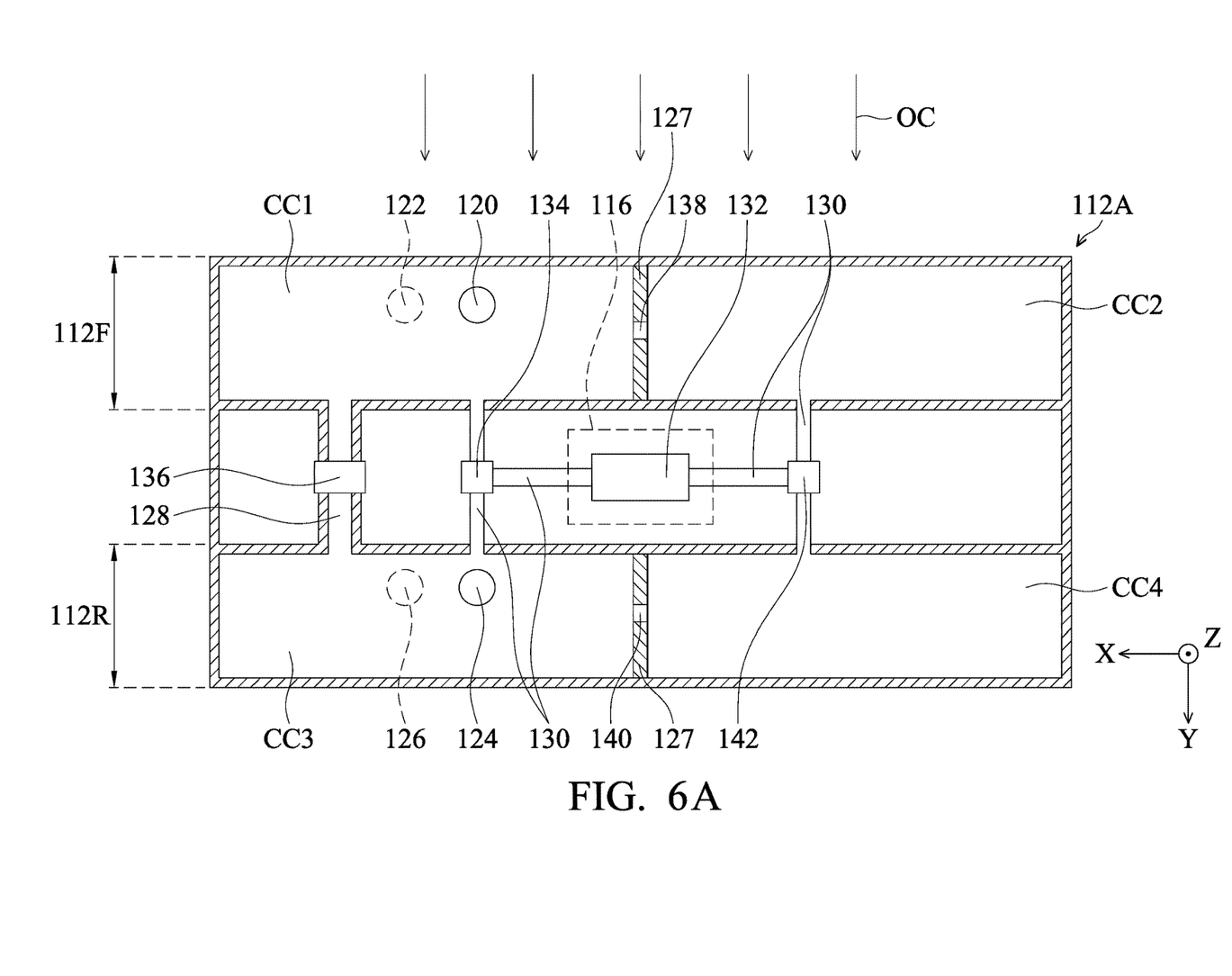
FIG. 6A is a top view of a foil floating member according to another embodiment of the invention.

Please refer to FIG. 6A, which is a top view of a foil floating member 112A according to another embodiment of the invention. In this embodiment, the front body 112F includes a first chamber CC1, a second chamber CC2 and a first communication valve 138, and the rear body 112R includes a third chamber CC3, a fourth chamber CC4 and a second communication valve 140. The first chamber CC1 is communicated with the second chamber CC2 through the first communication valve 138, and the third chamber CC3 is communicated with the fourth chamber CC4 through the second communication valve 140.

The front body 112F also includes the front vent valve 120 and the front water valve 122 which are communicated with at least one of the first chamber CC1 and the second chamber CC2. For example, in this embodiment, both the front vent valve 120 and the front water valve 122 are communicated with the first chamber CC1, but it is not limited thereto. In one embodiment, the front vent valve 120 is communicated with the first chamber CC1, and the front water valve 122 is communicated with the second chamber CC2. Similarly, the front body 112F includes the rear vent valve 124 and the rear water valve 126 which are communicated with at least one of the third chamber CC3 and the fourth chamber CC4. In this embodiment, the rear vent valve 124 and the rear water valve 126 are communicated with the third chamber CC3, but it is not limited thereto.

The control unit 116 can control the first communication valve 138 and the second communication valve 140 to open and control the front vent valve 120 and the rear vent valve 124 to open, so as to import seawater W through the front water valve 122 and the rear water valve 126, and to discharge the air in the first chamber CC1 to the fourth chamber CC4 through the front vent valve 120 and the rear vent valve 124. However, the control unit 116 can control the front water valve 122 and the rear water valve 126 to open, so as to import seawater into or discharge seawater from the first chamber CC1 to the fourth chamber CC4. For example, when it is desired to import seawater into the first chamber CC1 and the second chamber CC2, the control unit 116 controls the front vent valve 120, the front water valve 122 and the first communication valve 138 to open, so that the air is discharged through the front vent valve 120, and seawater is imported into the first chamber CC1 through the front water valve 122, and then seawater flows to the second chamber CC2 through the first communication valve 138. Furthermore, when it is desired to import seawater into the third chamber CC3 and the fourth chamber CC4, the control unit 116 controls the rear vent valve 124, the rear water valve 126 and the second communication valve 140 to open, so that the air is discharged through the rear vent valve 124, and seawater is imported into the third chamber CC3 through the rear water valve 126, and then seawater flows to the fourth chamber CC4 through second communication valve 140.

In addition, the foil floating member 112A includes the communicating tube 128 and the high-pressure gas pipe 130. In this embodiment, the communicating tube 128 is communicated with the first chamber CC1 and the third chamber CC3, but it is not limited thereto. For example, the communicating tube 128 can be communicated with the first chamber CC1 and the fourth chamber CC4. The high-pressure gas pipe 130 is communicated with the first chamber CC1 to the fourth chamber CC4, and the high-pressure gas pipe 130 is higher than the communicating tube 128 in the Z axis. The control unit 116 includes the high-pressure gas generator 132, the first control valve 134, the second control valve 136 and a third control valve 142. The first control valve 134 and the third control valve 142 are disposed on the high-pressure gas pipe 130, and the second control valve 136 is disposed on the communicating tube 128. The control unit 116 can control the first control valve 134 to open, so that the high-pressure gas generated from the high-pressure gas generator 132 flows to the first chamber CC1 or the second chamber CC2, and the control unit 116 can control the third control valve 142 to open, so that the high-pressure gas flows generated from the high-pressure gas generator 132 flows to the third chamber CC3 or the fourth chamber CC4. The control unit 116 can control the second control valve 136 to open, so that seawater in the first chamber CC1 flows to the third chamber CC3 through the communicating tube 128, or seawater in the third chamber CC3 flows to the first chamber CC1 through the communicating tube 128.

When it is desired to raise the foil floating member 112A by the hydrodynamic force HF, the control unit 116 can control the first communication valve 138 and the second communication valve 140 to open, and can control the high-pressure gas generator 132 to generate the high-pressure gas. At the same time, the control unit 116 can control the first control valve 134 and the third control valve 142 to open, so that the high-pressure gas flows to the first chamber CC1 and the second chamber CC2, and the high-pressure gas pushes seawater in the first chamber CC1 and the second chamber CC2 to flow into the third chamber CC3 and the fourth chamber CC4 through communicating tube 128. Therefore, the center of gravity of the foil floating member 112A moves along the Y axis from a central position of the foil floating member 112A toward the third chamber CC3 and the fourth chamber CC4, so that the foil floating member 112A tilts (similar to the posture of the foil floating member 112 in FIG. 4).

Conversely, when it is desired to push the foil floating member 112A downward by the hydrodynamic force HF, the control unit 116 can control the first communication valve 138 and the second communication valve 140 to open, and can control the high-pressure gas generator 132 to generate the high-pressure gas. At the same time, the control unit 116 can control the first control valve 134 and the third control valve 142 to open, so that the high-pressure gas flows to the third chamber CC3 and the fourth chamber CC4, and the high-pressure gas pushes seawater in the third chamber CC3 and the fourth chamber CC4 to flow into the first chamber CC1 and the second chamber CC2 through communicating tube 128. Therefore, the center of gravity of the foil floating member 112A moves from the central position of the foil floating member 112A toward the first chamber CC1 and the second chamber CC2, so that the foil floating member 112A tilts (similar to the posture of the foil floating member 112 in FIG. 5)

It should be noted that when the ocean current OC is unstable causing the tilt of the foil floating member 112A, so that the center of gravity of the foil floating member 112A moves along the X axis from the central position to the left side. At this time, the control unit 116 can control the first communication valve 138 and the second communication valve 140 to open, and can control the high-pressure gas generator 132 to transmit the high-pressure gas to the first chamber CC1 and the third chamber CC3, so that the high-pressure gas pushes seawater in the first chamber CC1 and the third chamber CC3 to respectively flow into the second chamber CC2 and the fourth chamber CC4 through the first communication valve 138 and the second communication valve 140. As a result, the center of gravity of the foil floating member 112A moves back to the central position.

Conversely, when the ocean current OC is unstable causing the tilt of the foil floating member 112A, so that the center of gravity of the foil floating member 112A move along the X axis from the central position to the right side. At this time, the control unit 116 can control the first communication valve 138 and the second communication valve 140 to open, and can control the high-pressure gas generator 132 to transmit the high-pressure gas to the second chamber CC2 and the fourth chamber CC4, so that the high-pressure gas pushes seawater in the second chamber CC2 and the fourth chamber CC4 to respectively flow into the first chamber CC1 and the third chamber CC3 through the first communication valve 138 and the second communication valve 140. As a result, the center of gravity of the foil floating member 112A moves back to the central position. Because the control unit 116 can control the amounts of seawater in the first chamber CC1 to the fourth chamber CC4, the center of gravity of the foil floating member 112A can quickly move back to the central position when the foil floating member 112A encounters an unstable ocean current OC.

In addition, similar to the previous embodiment, the foil floating member 112A of this embodiment can also include a plurality of bulkheads which are disposed in the first chamber CC1 to the fourth chamber CC4 (not shown in the figures). Each of the bulkheads includes a through hole for avoiding the free surface effect.

Figure 6B:
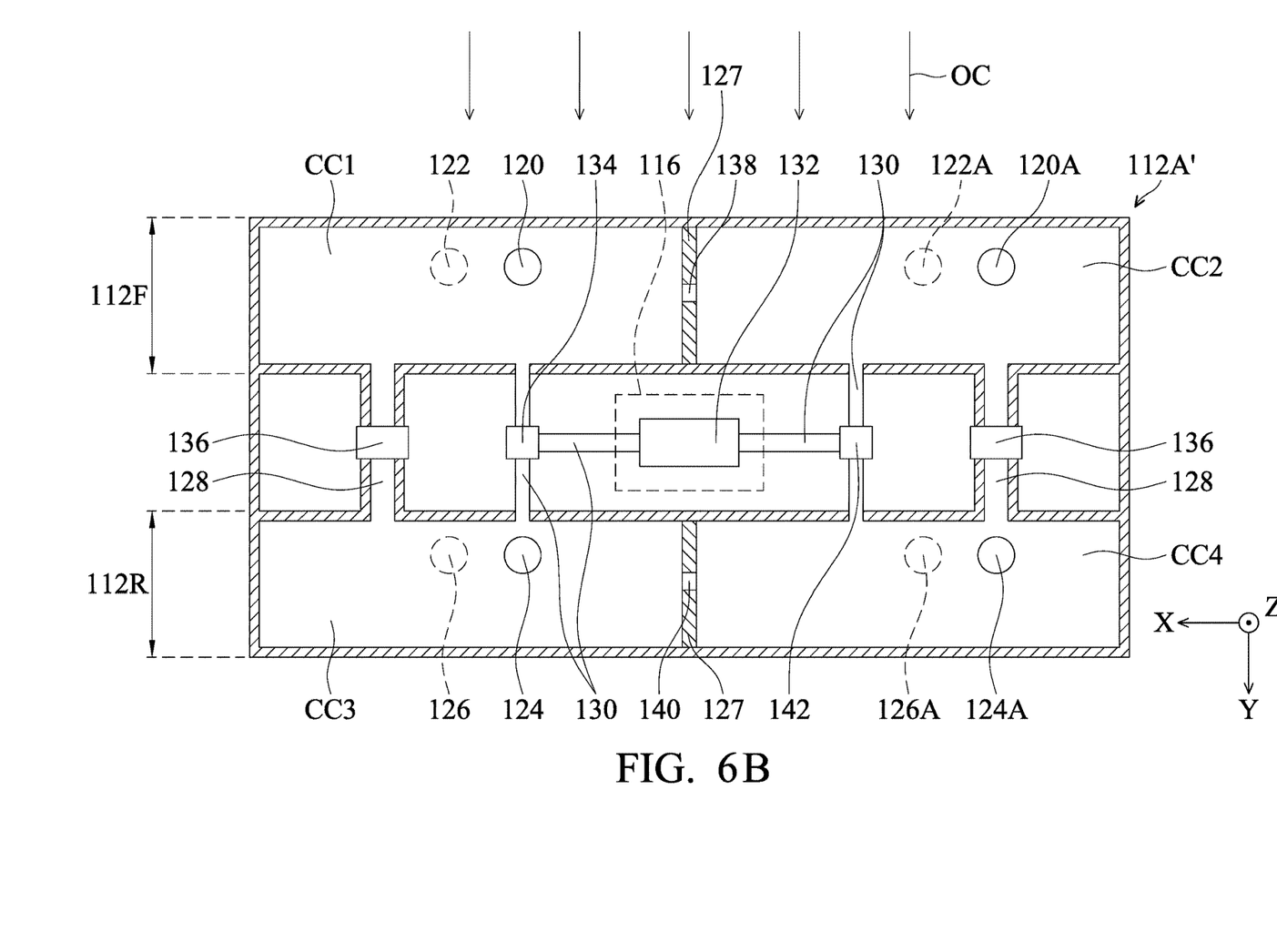
FIG. 6B is a top view of a foil floating member according to another embodiment of the invention.

Please refer to FIG. 6B, which is a top view of a foil floating member 112A' according to another embodiment of the invention. In contrast to the foil floating member 112A, the foil floating member 112A' includes two second control valves 136 and two communicating tubes 128. One of the communicating tubes 128 is communicated with the first chamber CC1 and the third chamber CC3, and the other communicating tube 128 is communicated with the second chamber CC2 and the fourth chamber CC4. Two second control valves 136 are respectively disposed the two communicating tubes 128. The control unit 116 can control the second control valve 136 on the right side to open, so that seawater flows between the second chamber CC2 and the fourth chamber CC4.

In addition, the front body 112F further includes a front vent valve 120A and a front water valve 122A, which are communicated with the second chamber CC2. The rear body 112R further includes a rear vent valve 124A and a rear water valve 126A, which are communicated with the fourth chamber CC4. Based on this configuration, control unit 116 can control the front vent valve 120A and the front water valve 122A to open, so as to independently discharge the air, seawater from the second chamber CC2, or to import seawater into the second chamber CC2. In other words, based on this configuration, the control unit 116 can control every one of the first chamber CC1 to the fourth chamber CC4 to independently discharge the air and seawater, or to import seawater. Other structures and the principle of operation of the foil floating member 112A' are similar to the previous embodiment, so descriptions thereof are not repeated herein.

Figure 7:
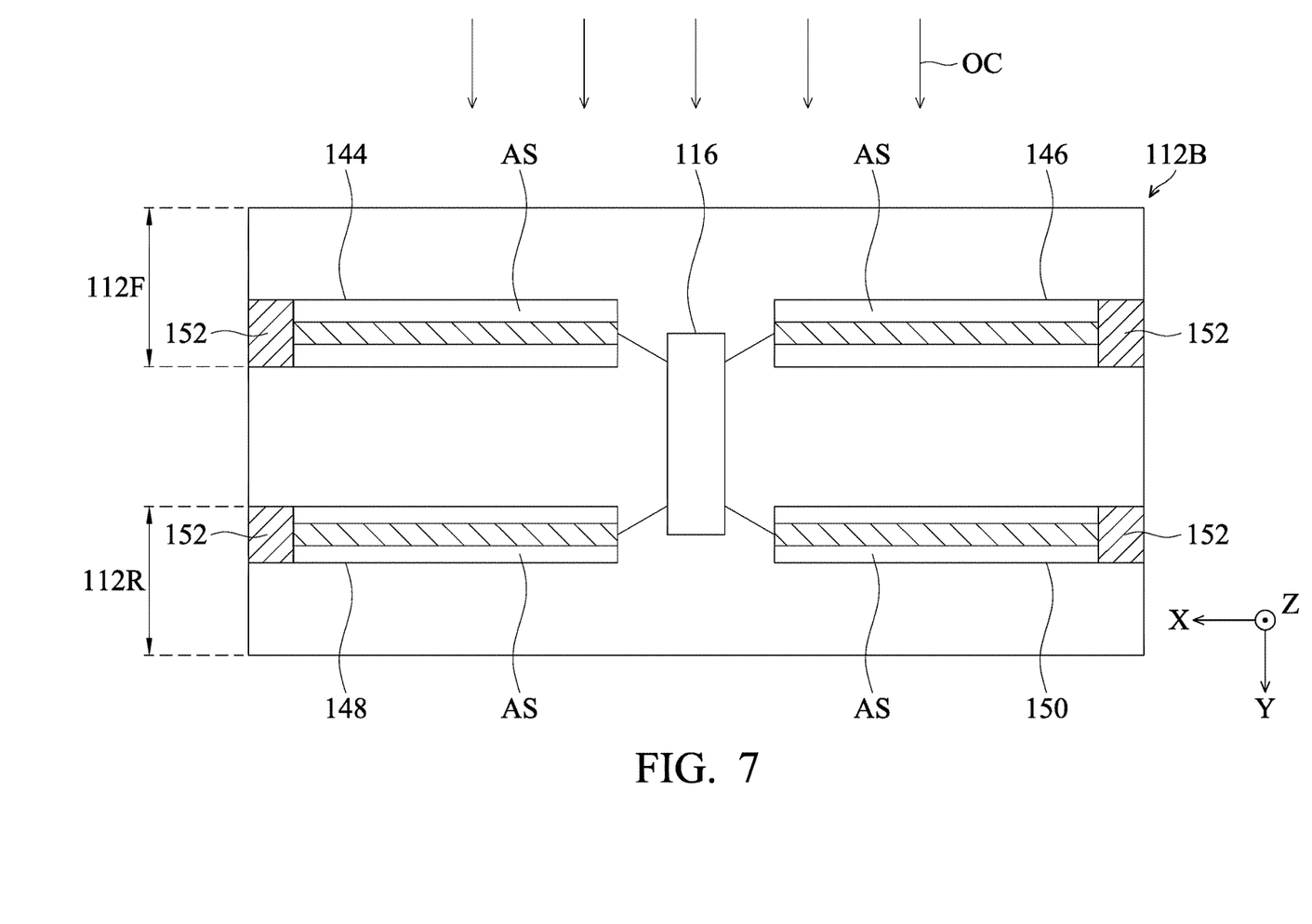
FIG. 7 is a top view of a foil floating member according to another embodiment of the invention.

Please refer to FIG. 7, which is a top view of a foil floating member 112B according to another embodiment of the invention. In this embodiment, the foil floating member 112B includes four piston mechanisms 144, 146, 148 and 150. The piston mechanism 144 and the piston mechanism 146 are disposed in the front body 112F, and the piston mechanism 148 and the piston mechanism 150 are disposed in the rear body 112R. Each of the piston mechanisms includes a receiving space AS and a piston member 152. The piston member 152 is movably disposed in the receiving space AS, and the control unit 116 can control the piston member 152 to move along the X axis in the receiving space AS, so that seawater W can enter the receiving space AS or can be discharged from the receiving space AS by the piston member 152. In particular, the control unit 116 can utilize a drive motor and a plurality of screw rods (not shown in the figures) to drive these piston members 152 to move in the receiving spaces AS, but it is not limited thereto.

Figure 8:
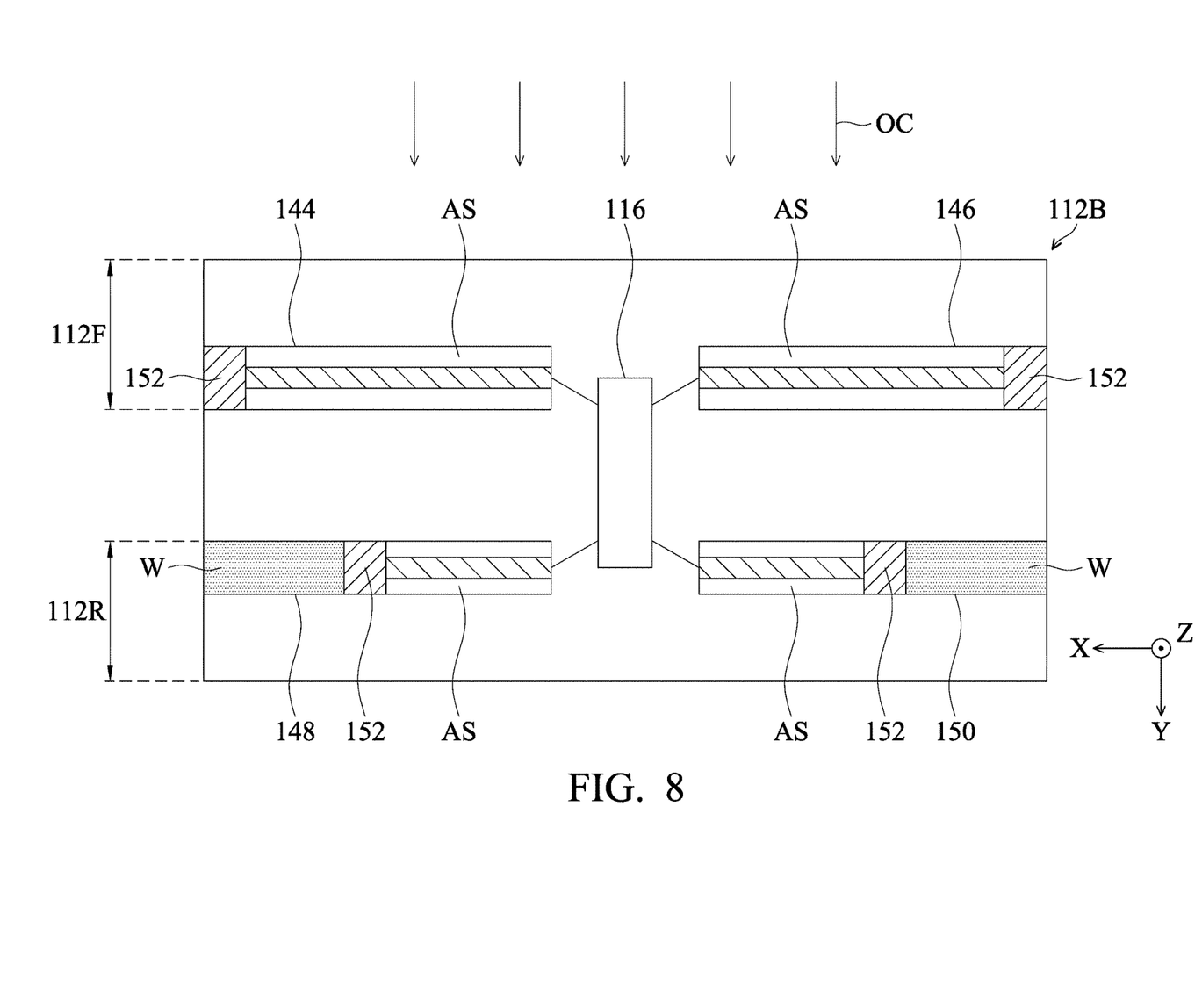
FIG. 8 is a diagram illustrating that two piston members of two piston mechanisms in the rear body move inward.

Next, please refer to FIG. 7 and FIG. 8 at the same time. FIG. 8 is a diagram illustrating that the piston members 152 of the piston mechanism 148 and the piston mechanism 150 move inward. When it is desired to raise the foil floating member 112B in FIG. 7 by the hydrodynamic force HF, the control unit 116 can utilize the drive motor and the screw rods (not shown in the figures) to drive the piston members 152 of the piston mechanism 148 and the piston mechanism 150 to move inward, so that seawater W enters the receiving spaces AS of the piston mechanism 148 and the piston mechanism 150. As shown in FIG. 8, the volume of seawater W entering the piston mechanism 148 is equal to the volume of seawater W entering the piston mechanism 150. Therefore, the center of gravity of the foil floating member 112B moves from the central position toward the rear body 112R, so that the foil floating member 112B tilts (similar to the posture of the foil floating member 112 in FIG. 4). As a result, the foil floating member 112B is raised by the hydrodynamic force HF.

Figure 9:
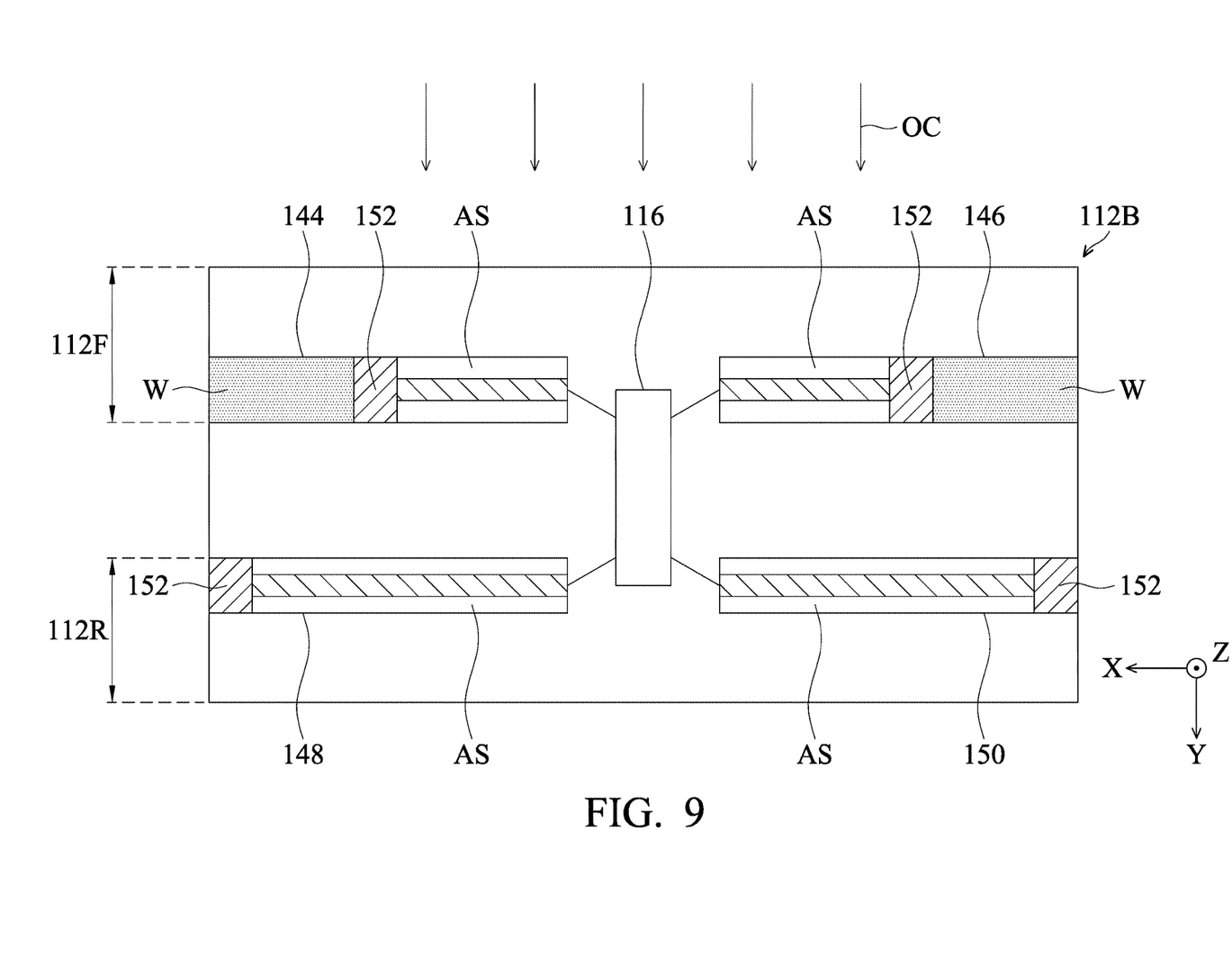
FIG. 9 is a diagram illustrating that two piston members of two piston mechanisms in the front body move inward.

Next, please refer to FIG. 7 and FIG. 9 at the same time. FIG. 9 is a diagram illustrating that the piston members 152 of the piston mechanism 144 and the piston mechanism 146 move inward. When it is desired to push the foil floating member 112B in FIG. 7 downward by the hydrodynamic force HF, the control unit 116 controls the piston members 152 of the piston mechanism 144 and the piston mechanism 146 to move inward, so that seawater W enters the receiving spaces AS of the piston mechanism 144 and the piston mechanism 146. As shown in FIG. 9, the volume of seawater W entering the piston mechanism 144 is equal to the volume of seawater W entering the piston mechanism 146. Therefore, the center of gravity of the foil floating member 112B moves along the Y axis from the central position toward the front body 112F, so that the foil floating member 112B tilts (similar to the posture of the foil floating member 112 in FIG. 5). As a result, the foil floating member 112B is pushed downward by the hydrodynamic force HF.

In conclusion, the invention provides an ocean current power generating device 100, and the control unit 116 of the ocean current power generating device 100 can control the amount of seawater in the front body 112F or the rear body 112R, so as to change the position of the center of gravity of the foil floating member, so that the foil floating member tilts to be raised upward or to be pushed downward by the hydrodynamic force HF in the ocean current OC. As a result, the depth of the main body 102 in the ocean O can be changed. Therefore, in contrast to a conventional ocean current power generating device which only utilizes the buoyancy to control the depth, the ocean current power generating device 100 of the invention can save more energy and can submerge to a deeper position in the ocean O.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An ocean current power generating device, disposed in the ocean, the ocean current power generating device comprising
two power generators, each of the power generators including an impeller, wherein the ocean current drives the impeller to rotate to generate electricity;
a foil floating member, connected to the two power generators, and the foil floating member including a front body and a rear body; and
a control unit, configured to control the amount of seawater in the front body and in the rear body so as to adjust the center of gravity and an attitude of the foil floating member, so that a depth of the ocean current power generating device can be controlled by the hydrodynamic force of the ocean current.

2. The ocean current power generating device as claimed in claim 1, wherein the front body includes a front chamber, the rear body includes a rear chamber, and the foil floating member further includes a central chamber, disposed between the front chamber and the rear chamber, so as to receive the control unit.

3. The ocean current power generating device as claimed in claim 2, wherein the foil floating member further includes a plurality of bulkheads, disposed in the front chamber to divide the front chamber into a plurality of spaces, wherein each of the bulkheads includes a bottom portion and a through hole, and the through hole is disposed near the bottom portion and communicates with the spaces.

4. The ocean current power generating device as claimed in claim 2, wherein the volume of the front chamber is equal to the volume of the rear chamber.

5. The ocean current power generating device as claimed in claim 2, wherein the front body includes a front vent valve and a front water valve, which are communicated with the front chamber, and the rear body includes a rear vent valve and a rear water valve, which are communicated with the rear chamber;
wherein the control unit controls the front vent valve and the rear vent valve to open to discharge the air in the front chamber and the rear chamber, and the control unit controls the front water valve and the rear water valve to open, so as to import seawater into or discharge seawater from the front chamber and the rear chamber.

6. The ocean current power generating device as claimed in claim 5, wherein the foil floating member further includes a communicating tube, communicated with the front chamber and the rear chamber, so as to allow seawater to flow between the front chamber and the rear chamber.

7. The ocean current power generating device as claimed in claim 6, wherein the foil floating member further includes a high-pressure gas pipe, communicated with the front chamber and the rear chamber, and the control unit includes a high-pressure gas generator;
wherein the high-pressure gas generated from the high-pressure gas generator flows to the front chamber or the rear chamber through the high-pressure gas pipe, so as to push seawater to flow in the communicating tube.

8. The ocean current power generating device as claimed in claim 7, wherein when the high-pressure gas generator inflates the front chamber, seawater in the front chamber flows into the rear chamber through the communicating tube, so that the center of gravity of the foil floating member moves toward the rear chamber, and the front body of the foil floating member tilts upward relative to a horizontal plane.

9. The ocean current power generating device as claimed in claim 7, wherein when the high-pressure gas generator inflates the rear chamber, seawater in the rear chamber flows into the front chamber through the communicating tube, so that the center of gravity of the foil floating member moves toward the front chamber, and the front body of the foil floating member tilts downward relative to a horizontal plane.

10. The ocean current power generating device as claimed in claim 1, wherein the front body includes a first chamber, a second chamber and a first communication valve, the rear body includes a third chamber, a fourth chamber and a second communication valve, the first chamber is communicated with the second chamber through the first communication valve, and the third chamber is communicated with the fourth chamber through the second communication valve.

11. The ocean current power generating device as claimed in claim 10, wherein the foil floating member further includes a plurality of bulkheads, disposed in the first to the fourth chambers, wherein each of the bulkheads includes a bottom portion and a through hole, and the through hole is disposed near the bottom portion.

12. The ocean current power generating device as claimed in claim 10, wherein the front body includes a front vent valve and a front water valve, communicated with the first chamber, and the rear body includes a rear vent valve and a rear water valve, communicated with the third chamber;
wherein the control unit controls the first communication valve, the second communication valve, the front vent valve and the rear vent valve to open to discharge the air in the first to the fourth chambers, and the control unit controls the front water valve and rear water valve to open, so as to import seawater into or discharge seawater from the first to the fourth chambers.

13. The ocean current power generating device as claimed in claim 12, wherein the foil floating member further includes a communicating tube, communicated with the first chamber and the third chamber, so as to allow seawater to flow between the first chamber and the third chamber.

14. The ocean current power generating device as claimed in claim 13, wherein the foil floating member further includes a high-pressure gas pipe, communicated with the first to the fourth chambers, and the control unit includes a high-pressure gas generator;
wherein the high-pressure gas generated from the high-pressure gas generator flows to at least one of the first to the fourth chambers through the high-pressure gas pipe.

15. The ocean current power generating device as claimed in claim 14, wherein when the control unit controls the first communication valve and the second communication valve to open, the high-pressure gas generator transmits the high-pressure gas to the first chamber and the third chamber to push seawater in the first chamber and the third chamber to respectively flow into the second chamber and the fourth chamber, so that the center of gravity of the foil floating member moves toward the second chamber and the fourth chamber.

16. The ocean current power generating device as claimed in claim 14, wherein when the control unit controls the first communication valve and the second communication valve to open, the high-pressure gas generator transmits the high-pressure gas to the second chamber and the fourth chamber to push seawater in the second chamber and the fourth chamber to respectively flow into the first chamber and the third chamber, so that the center of gravity of the foil floating member moves toward the first chamber and the third chamber.

17. The ocean current power generating device as claimed in claim 1, wherein the ocean current power generating device further includes four piston mechanisms, configured to import seawater into or discharge seawater from the foil floating member, wherein two of the piston mechanisms are disposed in the front body, and the other two piston mechanisms are disposed in the rear body.

18. The ocean current power generating device as claimed in claim 17, wherein each of the piston mechanisms comprises
a receiving space, formed in the foil floating member; and
a piston member, movably disposed in the receiving space;

wherein the control unit drives the piston member to move in the receiving space, so as to allow seawater to enter the receiving space or to discharge seawater from the receiving space.

19. The ocean current power generating device as claimed in claim 1, wherein the ocean current power generating device further comprises
an anchor block, fixed on the seabed; and
two cables, configured to connect the two power generators with the anchor block.

20. The ocean current power generating device as claimed in claim 19, wherein the ocean current power generating device further comprises at least one floating body, connected to the two cables and disposed between the anchor block and the two power generators.

21. The ocean current power generating device as claimed in claim 1, wherein the control unit is configured to selectively increase the amount of seawater in the front body relative to the amount of seawater in the rear body so as to move the center of gravity towards the front body and cause the foil floating member to tilt into an attitude with the front body lower than the rear body, or decrease the amount of seawater in the front body relative to the amount of seawater in the rear body so as to move the center of gravity towards the rear body and cause the foil floating member to tilt into an attitude position with the front body higher than the rear body, so as to adjust an attack angle formed between the foil floating member and a direction of the ocean current, and thereby adjust the depth of the ocean current power generating device by upward or downward force generated by the hydrodynamic force of the ocean current onto the foil floating member.

22. The ocean current power generating device as claimed in claim 1, wherein the control unit is configured to raise the ocean current power generating device to sea level by first selectively increasing the amount of seawater in the front body relative to the amount of seawater in the rear body so as to move the center of gravity towards the front body and cause the foil floating member to tilt into an attitude with the front body lower than the rear body, or decreasing the amount of seawater in the front body relative to the amount of seawater in the rear body so as to move the center of gravity towards the rear body and cause the foil floating member to tilt into an attitude position with the front body higher than the rear body, so as to adjust an attack angle formed between the foil floating member and a direction of the ocean current, and thereby adjust the depth of the ocean current power generating device by upward force generated by the hydrodynamic force of the ocean current onto the foil floating member, and then when the depth of the ocean current has decreased to a threshold level, discharge water from the front body and/or the rear body, such the ocean current power generating device is raised to the sea level by the force of buoyancy.

* * * * *